(12) United States Patent
Matsuno et al.

(10) Patent No.: US 12,371,004 B2
(45) Date of Patent: Jul. 29, 2025

(54) DRIVING/BRAKING FORCE CONTROL APPARATUS

(71) Applicant: SUBARU CORPORATION, Tokyo (JP)

(72) Inventors: Koji Matsuno, Tokyo (JP); Takeshi Yoneda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 338 days.

(21) Appl. No.: 18/303,215

(22) Filed: Apr. 19, 2023

(65) Prior Publication Data

US 2023/0382367 A1 Nov. 30, 2023

(30) Foreign Application Priority Data

May 27, 2022 (JP) .................. 2022-086694

(51) Int. Cl.
*B60W 30/045* (2012.01)
*B60W 10/08* (2006.01)
(Continued)

(52) U.S. Cl.
CPC .......... *B60W 30/045* (2013.01); *B60W 10/08* (2013.01); *B60W 10/18* (2013.01);
(Continued)

(58) Field of Classification Search
None
See application file for complete search history.

(56) References Cited

U.S. PATENT DOCUMENTS 8,983,748 B2 * 3/2015 Takahashi ............. B60W 10/18 701/70
2017/0183009 A1 * 6/2017 Isono .................. B60L 15/2009
(Continued)

FOREIGN PATENT DOCUMENTS

CN 104918843 A * 9/2015 ........... B62D 15/025
JP 2021-142897 A 9/2021

OTHER PUBLICATIONS

Raymond Brach, The Tire-Force (Friction Ellipse) and Tire Characteristics, SAE Accessed through https://www.brachengineering.com/content/publications/SAE-2011-01-0094-Brach-Engineering.pdf (Year: 2011).*

(Continued)

*Primary Examiner* — Wade Miles
*Assistant Examiner* — Arslan Azhar
(74) *Attorney, Agent, or Firm* — Rimon P.C.

(57) ABSTRACT

A driving/braking force control apparatus includes a front-wheel longitudinal force generator, a rear-wheel longitudinal force generator, a tire slip angle output unit, a tire lateral force output unit, a slip ratio output unit, a tire lateral force change rate output unit, a target yaw moment setting unit, and a driving/braking force distribution control unit. The driving/braking force distribution control unit performs a control of an output allocation ratio between the front-wheel longitudinal force generator and the rear-wheel longitudinal force generator based on a target value of an additional yaw moment, a change rate of a tire lateral force of a front wheel to a slip ratio of the front wheel, and a change rate of a tire lateral force of a rear wheel to a slip ratio of the rear wheel.

9 Claims, 15 Drawing Sheets

(51) Int. Cl.
B60W 10/18 (2012.01)
B60W 30/18 (2012.01)

(52) U.S. Cl.
CPC ... B60W 30/18145 (2013.01); *B60W 2520/14* (2013.01); *B60W 2520/26* (2013.01); *B60W 2710/08* (2013.01); *B60W 2710/18* (2013.01); *B60W 2720/00* (2013.01); *B60W 2720/26* (2013.01)

(56) References Cited

U.S. PATENT DOCUMENTS

2021/0284129 A1* 9/2021 Hori .................... B60L 15/2009
2023/0313873 A1* 10/2023 Hajiloo .................. F16H 48/36
                                                                  701/68

OTHER PUBLICATIONS

Shiang-Lung Koo, Nonlinear Tire Lateral Force versus Slip Angle Curve Identification, Proceeding of the 2004 American Control Conference Boston, Massachusetts (Year: 2004).*

* cited by examiner

DRIVING/BRAKING FORCE CONTROL APPARATUS

CROSS-REFERENCE TO RELATED APPLICATIONS

The present application claims priority from Japanese Patent Application No. 2022-086694 filed on May 27, 2022, the entire contents of which are hereby incorporated by reference.

BACKGROUND

The disclosure relates to a driving/braking force control apparatus to be provided in a vehicle in which a driving/braking force of a front wheel and a driving/braking force of a rear wheel are individually controllable.

As a technique related to a driving force control of a four-wheel-drive electric vehicle including driving motors provided for front wheels and rear wheels independently of each other, for example, Japanese Unexamined Patent Application Publication (JP-A) No. 2021-142897 discloses a vehicle behavior control apparatus that includes a front-wheel driving motor, a rear-wheel driving motor, and a braking device. The braking device applies a braking force to the wheels independently of each other. If a tire force of each of the wheels is less than or equal to a friction circle limit value when each of the driving motors is controlled based on target driving torque set to control behavior of a vehicle, each of the driving motors is controlled based on the target driving torque. If the tire force of each of the wheels is greater than the friction circle limit value when each of the driving motors is controlled based on the target driving torque, the braking device is controlled based on target braking torque.

SUMMARY

An aspect of the disclosure provides a driving/braking force control apparatus that includes a front-wheel longitudinal force generator, a rear-wheel longitudinal force generator, a tire slip angle output unit, a tire lateral force output unit, a slip ratio output unit, a tire lateral force change rate output unit, a target yaw moment setting unit, and a driving/braking force distribution control unit. The front-wheel longitudinal force generator is configured to generate a longitudinal force of a front wheel of a vehicle. The rear-wheel longitudinal force generator is configured to generate a longitudinal force of a rear wheel of the vehicle. The tire slip angle output unit is configured to output a tire slip angle of the front wheel and a tire slip angle of the rear wheel based on a turning state of the vehicle. The tire lateral force output unit is configured to output a tire lateral force of the front wheel and a tire lateral force of the rear wheel based on the turning state of the vehicle. The slip ratio output unit is configured to output a slip ratio of the front wheel and a slip ratio of the rear wheel based on the tire slip angle of the front wheel, the tire slip angle of the rear wheel, the tire lateral force of the front wheel, and the tire lateral force of the rear wheel. The tire lateral force change rate output unit is configured to output a change rate of the tire lateral force of the front wheel to the slip ratio of the front wheel and a change rate of the tire lateral force of the rear wheel to the slip ratio of the rear wheel. The target yaw moment setting unit is configured to set a target value of an additional yaw moment to be applied to the vehicle. The driving/braking force distribution control unit is configured to perform a control of an output allocation ratio between the front-wheel longitudinal force generator and the rear-wheel longitudinal force generator based on the target value of the additional yaw moment, the change rate of the tire lateral force of the front wheel to the slip ratio of the front wheel, and the change rate of the tire lateral force of the rear wheel to the slip ratio of the rear wheel.

An aspect of the disclosure provides a driving/braking force control apparatus that includes a front-wheel longitudinal force generator, a rear-wheel longitudinal force generator, and circuitry. The front-wheel longitudinal force generator is configured to generate a longitudinal force of a front wheel of a vehicle. The rear-wheel longitudinal force generator is configured to generate a longitudinal force of a rear wheel of the vehicle. The circuitry is configured to output a tire slip angle of the front wheel and a tire slip angle of the rear wheel based on a turning state of the vehicle. The circuitry is configured to output a tire lateral force of the front wheel and a tire lateral force of the rear wheel based on the turning state of the vehicle. The circuitry is configured to output a slip ratio of the front wheel and a slip ratio of the rear wheel based on the tire slip angle of the front wheel, the tire slip angle of the rear wheel, the tire lateral force of the front wheel, and the tire lateral force of the rear wheel. The circuitry is configured to output a change rate of the tire lateral force of the front wheel to the slip ratio of the front wheel and a change rate of the tire lateral force of the rear wheel to the slip ratio of the rear wheel. The circuitry is configured to set a target value of an additional yaw moment to be applied to the vehicle. The circuitry is configured to perform a control of an output allocation ratio between the front-wheel longitudinal force generator and the rear-wheel longitudinal force generator based on the target value of the additional yaw moment, the change rate of the tire lateral force of the front wheel to the slip ratio of the front wheel, and the change rate of the tire lateral force of the rear wheel to the slip ratio of the rear wheel.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
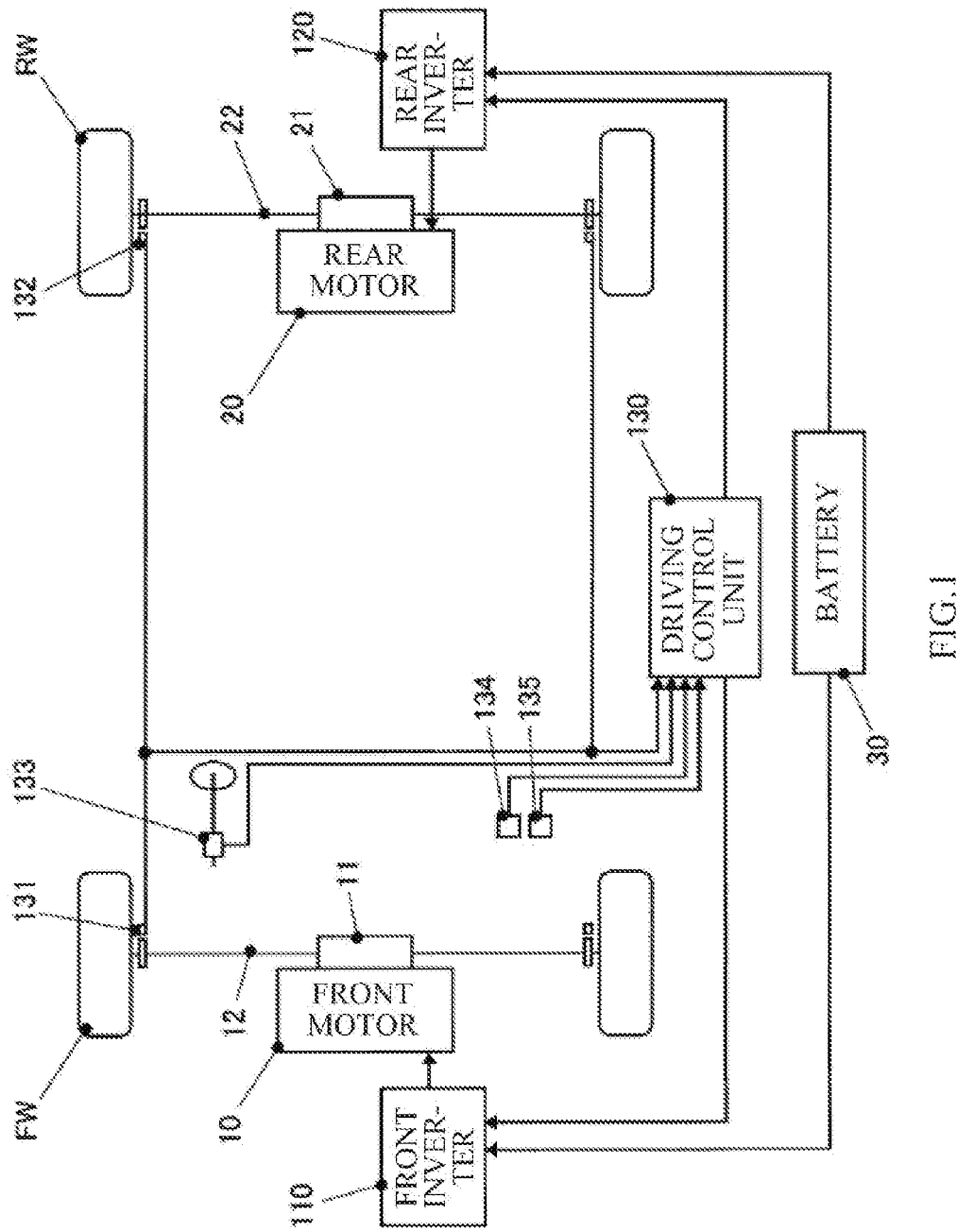
FIG. 1 is a diagram schematically illustrating a configuration of a driving system of a vehicle including a driving/braking force control apparatus according to one example embodiment of the disclosure.

A so-called friction circle is one of well-known existing concepts related to a relationship between a driving/braking force (a longitudinal force) and a lateral force of a tire. The friction circle is a circle resulting from connecting points where a resultant force of the driving/braking force and the lateral force (cornering force) generated at the tire is at the maximum.

In a technique disclosed in JP-A No. 2021-142897, for example, a control is performed to reduce a lateral force by increasing a driving force distributed to rear wheels, based on the above-described concept of the friction circle.

However, in an actual situation, even if driving force distribution is changed and a yaw moment is added to a vehicle, a change in vehicle body and a change in slip angle can be delayed due to a yaw inertia of the vehicle. Therefore, the resultant force of the driving/braking force and the lateral force generatable at a moment when the front-rear driving force distribution is changed can be less than a so-called friction circle limit. Accordingly, the lateral force may change before the driving/braking force causes the resultant force to reach the friction circle limit disclosed in JP-A No. 2021-142897.

In the technique disclosed in JP-A No. 2021-142897, the control is constructed based on a premise that the resultant force of the driving/braking force and the lateral force is usable up to the friction circle limit in any situation. Therefore, the tire can slip excessively depending on the control. To address this, an additional control such as a control to apply a braking force with use of a friction brake may be performed, which may be unnecessary if it were not for the excessive slip of the tire. This can lead to a concern such as an energy loss of a vehicle or occurrence of a noise, vibration, or a strange feeling (a feeling of unnatural deceleration) accompanying the operation of the friction brake.

It is desirable to provide a driving/braking force control apparatus that makes it possible to perform an appropriate driving/braking force control reflecting a state of a tire.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

A description is given below of a driving/braking force control apparatus according to a first example embodiment of the disclosure.

The driving/braking force control apparatus according to the first example embodiment may be provided, for example, in a vehicle that includes driving/braking motors for front-wheel driving and rear-wheel driving independently of each other. Non-limiting examples of the vehicle may include a passenger car. The driving/braking motors may each be a motor generator, for example.

FIG. 1 is a diagram schematically illustrating a configuration of a driving system of a vehicle 1 including the driving/braking force control apparatus according to the first example embodiment.

The vehicle 1 may be a four-wheel vehicle including a pair of right and left wheels FW and a pair of right and left rear wheels RW.

The vehicle 1 may include, for example, a front motor 10, a rear motor 20, a battery 30, a front inverter 110, a rear inverter 120, a driving control unit 130, and any other component.

The front motor 10 may be a rotating electric machine that generates a driving force of the front wheels FW.

For example, a permanent-magnet synchronous motor (PM motor) may be used as the front motor 10.

The front motor 10 may serve as a motor generator that receives electric power from the battery 30 to generate the driving force of the front wheels FW and perform regeneration with use of torque transmitted from the front wheel FW side to charge the battery 30.

In one embodiment, the front motor 10 may serve as a "front-wheel longitudinal force generator".

An output of the front motor 10 may be transmitted to the front wheels FW via a front differential 11 and a front drive shaft 12.

The front differential 11 may transmit the output of the front motor 10 to the front drive shaft 12 provided on the right and the left. The front differential 11 may also serve, for example, as a differential mechanism that absorbs a difference in rotation between the right and left front wheels FW caused by, for example, turning.

The front drive shaft 12 may be a rotational shaft that transmits the driving force from the front differential 11 to the right and left front wheels FW.

The front drive shaft 12 may be provided with a universal joint to follow, for example, steering of the front wheels FW and a stroke of a front suspension. Non-limiting examples of the universal joint may include a constant-velocity universal joint.

The rear motor 20 may be a rotating electric machine that generates a driving force of the rear wheels RW.

For example, a permanent-magnet synchronous motor may be used as the rear motor 20.

The rear motor 20 may serve as a motor generator that receives electric power from the battery 30 to generate the driving force of the rear wheels RW and perform regeneration with use of torque transmitted from the rear wheel RW side to charge the battery 30.

In one embodiment, the rear motor 20 may serve as a "rear-wheel longitudinal force generator". An output of the rear motor 20 may be transmitted to the rear wheels RW via a rear differential 21 and a rear drive shaft 22.

The rear differential 21 may transmit the output of the rear motor 20 to the rear drive shaft 22 provided on the right and the left. The rear differential 21 may also serve, for example, as a differential mechanism that absorbs a difference in rotation between the right and left rear wheels RW caused by, for example, turning.

The rear drive shaft 22 may be a rotational shaft that transmits the driving force from the rear differential 21 to the right and left rear wheels RW.

The rear drive shaft 22 may be provided with a universal joint to follow, for example, a stroke of a rear suspension. Non-limiting examples of the universal joint may include a constant-velocity universal joint.

The battery 30 may be a secondary battery that stores electric power to be used, for example, for traveling of the vehicle 1.

For example, a battery such as a lithium-ion battery may be used as the battery 30.

The front inverter 110 may convert a DC current supplied from the battery 30 into an AC current and supply the AC current to the front motor 10 as driving electric power, in accordance with a command given from the driving control unit 130.

In addition, upon the regeneration performed by the front motor 10, the front inverter 110 may also serve as a regenerative inverter that converts an AC current supplied from the front motor 10 into a DC current to charge the battery 30.

The rear inverter 120 may convert a DC current supplied from the battery 30 into an AC current and supply the AC current to the rear motor 20 as driving electric power, in accordance with a command given from the driving control unit 130.

In addition, upon the regeneration performed by the rear motor 20, the rear inverter 120 may also serve as a regenerative inverter that converts an AC current supplied from the rear motor 20 into a DC current to charge the battery 30.

The front inverter 110 and the rear inverter 120 may control output torque and an output shaft rotation speed of the front motor 10 and output torque and an output shaft rotation speed of the rear motor 20 in accordance with a target driving force or a target slip ratio of the front wheels FW instructed by the driving control unit 130 and a target driving force or a target slip ratio of the rear wheels RW instructed by the driving control unit 130, respectively.

The driving control unit 130 may give commands to the front inverter 110 and the rear inverter 120 to control respective outputs of the front motor 10 and the rear motor 20, for example, in accordance with driver requested torque set based on an operation such as an acceleration operation performed by a driver.

In addition, the driving control unit 130 may set a braking force allocation ratio between a regenerative brake and a hydraulic brake, for example, in accordance with an operation such as a braking operation performed by the driver.

In such a case, the driving control unit 130 may give respective commands to the front inverter 110 and the rear inverter 120 in accordance with a request for braking to be performed by the regenerative brake. The driving control unit 130 may thus cause the front motor 10 and the rear motor 20 to perform regeneration and thereby generate a braking force.

The driving control unit 130 may include a microcomputer, for example. The microcomputer may include, for example, an information processor, a storage, an input/output interface, a bus, and any other component. The information processor may include, for example, a central processing unit (CPU). The storage may include, for example, a random-access memory (RAM) and a read-only memory (ROM). The bus may couple the above-described components to each other.

Coupled to the driving control unit 130 may be, for example, vehicle speed sensors 131 and 132, a steering angle sensor 133, an acceleration sensor 134, a yaw rate sensor 135, and any other sensor.

The vehicle speed sensors 131 and 132 may be provided at a hub that rotatably supports the front wheel FW and a hub that rotatably supports the rear wheel RW, respectively.

The vehicle speed sensor 131 may be provided for each of the right and left front wheels FW. The vehicle speed sensor 132 may be provided for each of the right and left rear wheels RW.

The vehicle speed sensors 131 and 132 may each output a vehicle speed signal corresponding to a rotation speed of the corresponding wheel.

The driving control unit 130 may calculate a wheel speed of each of the wheels based on the corresponding vehicle speed signal.

The steering angle sensor 133 may be a sensor that detects a steering-wheel angle θ H, i.e., an angle position of a steering wheel on which an occupant such as the driver performs a steering operation.

The driving control unit 130 may be configured to calculate a steering angle of the front wheels FW based on the steering-wheel angle $\theta_H$ detected by the steering angle sensor 133 and a gear ratio n of an unillustrated steering gear box. The gear ratio n may be a constant.

The acceleration sensor 134 may be a sensor that detects acceleration in a front-rear direction and a right-left direction that acts on a vehicle body. The right-left direction may also be referred to as a vehicle-width direction.

The yaw rate sensor 135 may be a sensor that detects a yaw rate. The yaw rate may be a rotation speed of the vehicle body about a vertical axis.

The driving control unit 130 may set an output allocation between the front motor 10 and the rear motor 20 upon driving the front motor 10 and the rear motor 20, i.e., front-rear distribution (allocation ratio) of a driving force between the front wheels FW and the rear wheels RW.

Upon regeneration of the front motor 10 and the rear motor 20, the driving control unit 130 may set power generation amount distribution between the front motor 10 and the rear motor 20, i.e., front-rear distribution of a braking force generated by the regenerative brake between the front wheels FW and the rear wheels RW.

In addition, the driving control unit 130 may control driving force distribution and braking force distribution in accordance with a yaw moment to be added to the vehicle 1, for example, upon turning of the vehicle 1.

In one embodiment, the driving control unit 130 may serve as a "tire slip angle output unit", a "tire lateral force output unit", a "tire slip ratio output unit", a "tire lateral force change rate output unit", a "target yaw moment setting unit", and a "driving/braking force distribution control unit".

This will be described below in detail.

The following description refers to a driving situation as an example. A front-rear distribution control of the braking force at the time of braking by the regenerative brake may be performed in a similar manner.

Figure 2:
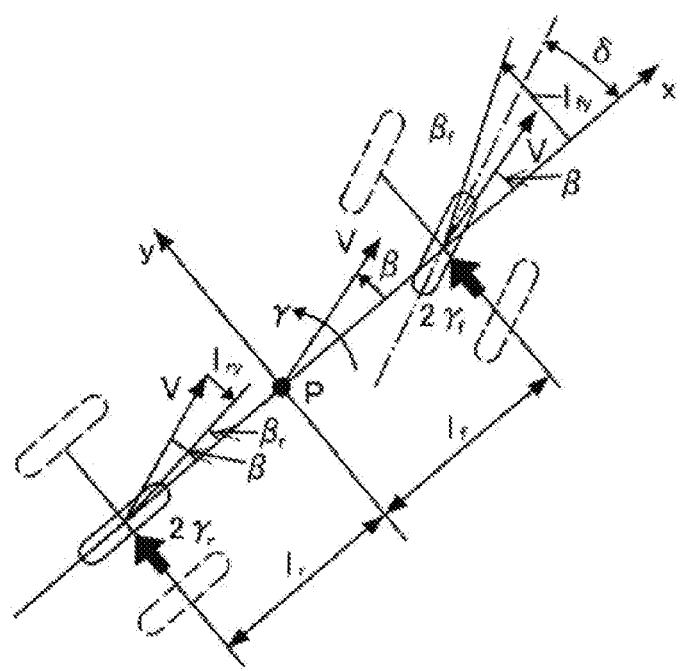
FIG. 2 is a diagram illustrating a two-wheel vehicle model equivalent to a four-wheel vehicle.

FIG. 2 is a diagram illustrating a two-wheel vehicle model equivalent to a four-wheel vehicle.

A vehicle-body slip angle β may be estimated by Expression 1 below.

$$\beta = \left( \frac{1 - \frac{m}{2 \cdot l} \frac{l_f}{l_r \cdot K_r} V^2}{\frac{m}{2 \cdot l^2} \frac{l_f \cdot K_f - l_r \cdot K_r}{K_f \cdot K_r} V^2} \right) \frac{l_r}{l} \delta \qquad \text{(Expression 1)}$$

$$= \frac{1 - \frac{m}{2 \cdot l} \frac{l_f}{l_r \cdot K_r} V^2}{1 + A \cdot V^2} \frac{l_r}{l} \delta$$

The vehicle-body slip angle β determined by Expression 1 may be converted into a tire slip angle $\alpha_f$ of the front wheel FW and a tire slip angle $\alpha_r$ of the rear wheel RW by Expressions 2 and 3 below.

[Expressions 2 and 3]

$$\begin{cases} \alpha_f = \delta_f - \beta - \frac{l_f \cdot \gamma}{V} \\ \alpha_r = -\beta + \frac{l_f \cdot \gamma}{V} \end{cases} \qquad \text{(Expressions 2 and 3)}$$

where:
β is a vehicle-body slip angle [rad];
l is a wheel base [m];
lf is a distance [m] from a front axle to the center of gravity;
lr is a distance [m] from a rear axle to the center of gravity;
A is a stability factor;
δ($\delta_f$) is a front-wheel steering angle [rad];
m is a mass [kg] of a vehicle;
$\alpha_f$ is a slip angle [rad] of the front wheel FW;
$\alpha_r$ is a slip angle [rad] of the rear wheel RW;
γ is a yaw rate [rad/s]; and
V is a vehicle speed [m/s].

Note that a value detected based on the output of the yaw rate sensor 135 may be used as the yaw rate γ.

Figure 3:
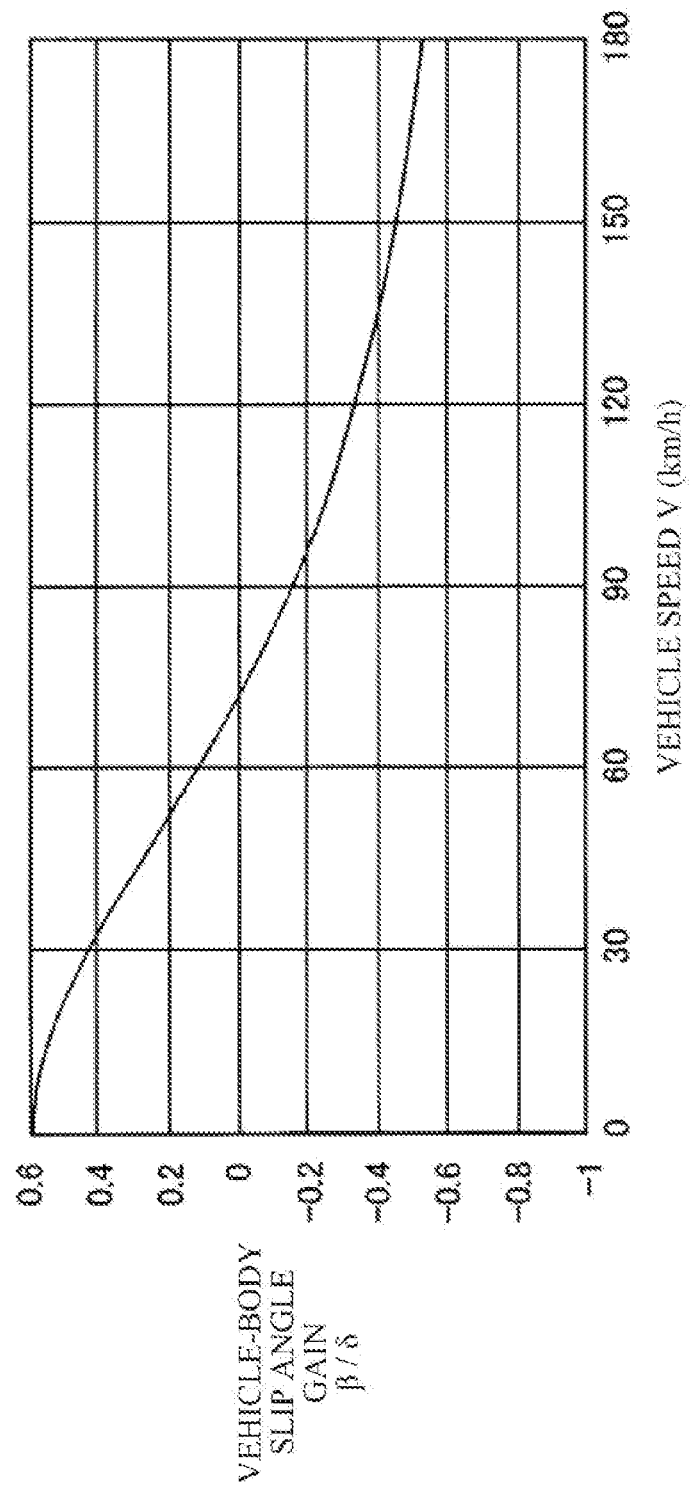
FIG. 3 is a diagram illustrating a correlation between a vehicle-body slip angle gain and a vehicle speed.

FIG. 3 is a diagram illustrating a correlation between a vehicle-body slip angle gain and a vehicle speed.

In FIG. 3, the horizontal axis represents a vehicle speed V [km/h], and the vertical axis represents a vehicle-body slip angle gain β/δ, i.e., the vehicle-body slip angle β per the steering angle δ.

As illustrated in FIG. 3, the vehicle-body slip angle gain β/δ may decrease in accordance with an increase in the vehicle speed V.

Figure 4:
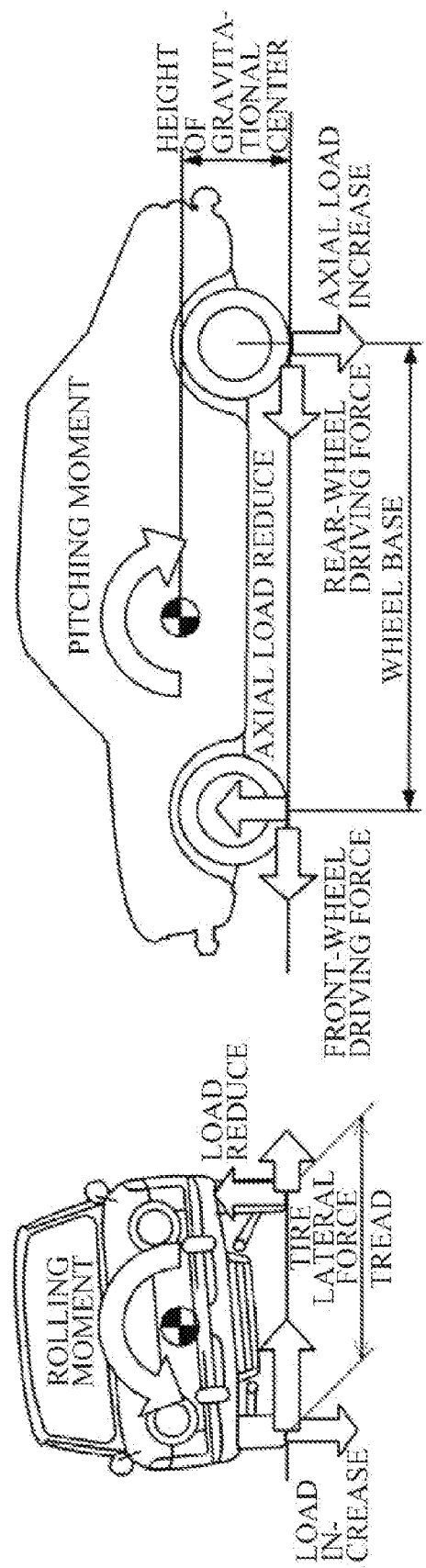
FIG. 4 is a schematic diagram illustrating an acting force at the time of turning, acceleration, and deceleration of a vehicle.

FIG. 4 is a schematic diagram illustrating an acting force at the time of turning, acceleration, and deceleration of a vehicle.

A vertical load including longitudinal load transfer caused by acceleration and deceleration when the vehicle travels straight may be represented by Expressions 4 and 5 below.

$$F_{zf} = F_{zf0} - \Delta F_{zx} \qquad \text{(Expression 4)}$$

$$F_{zr} = F_{zr0} + \Delta F_{zx} \qquad \text{(Expression 5)}$$

where:
$F_{zf}$ is a vertical load of a front wheel;
$F_{zr}$ is a vertical load of a rear wheel;
$F_{zf0}$ is a vertical load of the front wheel at the time of being stopped;
$F_{zr0}$ is a vertical load of the rear wheel at the time of being stopped; and
$\Delta F_{zx}$ is an amount of load transfer caused by acceleration.

The amount of the longitudinal load transfer $\Delta F_{zx}$ caused by the acceleration of the vehicle 1 may be represented by Expression 6 below.

$$\Delta F_{zx} = \frac{m \cdot \ddot{x} + h_g}{2 \cdot l} \qquad \text{(Expression 6)}$$

where:
m is a mass of a vehicle;
$\ddot{x}$ is longitudinal acceleration;
$h_g$ is a height of gravitational center; and
l is a wheel base.

A lateral load transfer caused by lateral acceleration at the time of turning may be represented by Expressions 7 and 8 below.

$$F_{zfi} = F_{zf0} - \Delta F_{zx} - \Delta F_{zy} \cdot K_{zy} \qquad \text{(Expression 7)}$$

$$F_{zri} = F_{zr0} + \Delta F_{zx} - \Delta F_{zy} \cdot (1 - K_{zy}) \qquad \text{(Expression 8)}$$

where:
$F_{zfi}$ is a vertical load of a front wheel on an inner-wheel side of turning;
$F_{zri}$ is a vertical load of a rear wheel on the inner-wheel side of turning;
$F_{zf0}$ is a vertical load of the front wheel at the time of being stopped;
$F_{zr0}$ is a vertical load of the rear wheel at the time of being stopped;
$\Delta F_{zy}$ is an amount of lateral load transfer caused by turning; and
$K_{zy}$ is a front axle allocation ratio of the lateral load transfer.

The amount of lateral load transfer $\Delta F_{zy}$ caused by turning may be represented by Expression 9 below.

$$\Delta F_{zy} = \frac{m \cdot \ddot{x} + h_g}{d} \qquad \text{(Expression 9)}$$

where:
$\ddot{y}$ is lateral acceleration; and
d is a tread.

Figure 5:
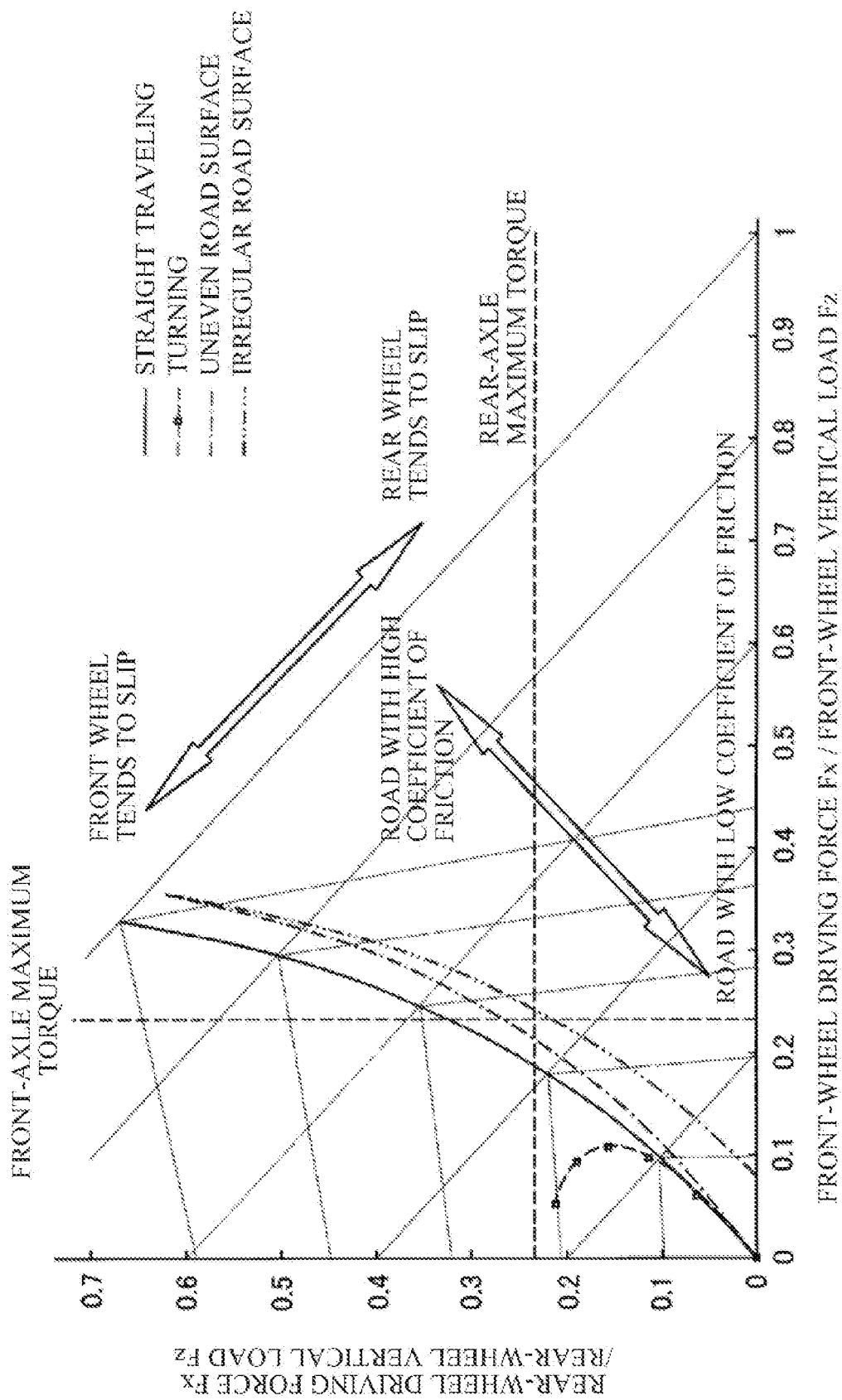
FIG. 5 is a diagram illustrating an example of a front-rear driving force distribution diagram of a vehicle.

FIG. 5 is a diagram illustrating an example of a front-rear driving force distribution diagram of a vehicle.

In FIG. 5, the horizontal axis represents a value resulting from dividing a driving force of a front wheel by a vertical load of the front wheel, and the vertical axis represents a value resulting from dividing a driving force of a rear wheel by a vertical load of the rear wheel.

A front-rear distribution of the vertical load $F_{zf}:F_{zr}$ may be used as a base of a driver requested driving force at a time when an additional yaw moment is zero. When greatly taking into consideration the inner wheel of turning, $F_{zi}:F_{zri}$ may be used as the base of the driver requested driving force at the time when the additional yaw moment is zero.

In FIG. 5, the front-rear driving force distribution for straight traveling is indicated by a solid line, and the front-rear driving force distribution for turning is indicated by a dashed line.

In order to prevent the front wheel FW and the rear wheel RW from irregularly slipping due to road surface disturbance or variation in coefficient of friction 11, i.e., due to an uneven road surface or an irregular road surface, the driving force distribution to the front axle may be set relatively great to thereby prevent the rear wheel RW from slipping.

For example, an example indicated by a dash-dot-dash line in FIG. 5 may be based on an uneven road surface having variation in vertical load of ±7.5%.

For example, an example indicated by a dash-dot-dot-dash line in FIG. 5 may be based on an irregular road surface having variation in coefficient of friction on a road surface of ±0.075.

For example, when a driver has selected a traveling mode that tends to cause oversteer in traveling such as sport traveling on a road such as a circuit road, the driving force distribution to the rear axle may be set relatively great as compared with that for normal traveling.

Next, a description is given of a method of estimating a slip ratio κ individually for each of the front and rear axles from a slip angle α of a tire and a tire lateral force $F_y$.

A characteristic expression combining a non-linear approximation expression of a tire lateral force and Magic Formula with each other may be represented by Expressions 10 and 11 below. Magic Formula may be a numerical calculation model of a tire.

$$F_y = \qquad \text{(Expression 10)}$$

$$Fy0 \cdot \cos(Rcy1 \cdot \tan^{-1}(Rby1 \cdot \cos(\tan^{-1}(Rby2 \cdot \alpha)) \cdot Rvy5 \cdot x))$$

$$Fy0 = Ky0 \cdot \alpha - \text{sign}(\alpha) \cdot \frac{Ky0^2}{4 \cdot \mu \cdot Fz} \cdot \alpha^2 \cdots \left(|\alpha| \leq \frac{2 \cdot \mu \cdot Fz}{Ky0}\right) \quad \text{(Expression 11)}$$

where:
Rby1, Rby2, Rcy1, and Rvy5 are parameter values of Magic Formula; and
Ky0 is cornering power (CP) at the time when a slip angle is zero.

The slip ratio κ may be represented by Expression 12 below.

$$\therefore \kappa = \qquad \text{(Expression 12)}$$

$$\frac{\tan\left(\frac{\cos^{-1}\left(\frac{Fy}{Ky0 \cdot \alpha - \text{sign}(\alpha) \cdot \frac{Ky0^2}{4 + \mu \cdot Fx} \cdot \alpha^2}\right)}{Rcy1}\right)}{Rby1 \cdot \cos(\tan^{-1}(Rby2 \cdot \alpha))Rvy5} \cdots \left(|\alpha| \leq \frac{2 \cdot \mu \cdot Fz}{Ky0}\right)$$

The tire lateral force Fy may be calculated from Expressions 13 and 14 below.

Front-axle Fy+rear-axle Fy=mass of vehicle×lateral acceleration (Expression 13)

Front-axle Fy×Lf=rear-axle Fy×Lr Yaw moment≈0 (Expression 14)

A change rate of a tire lateral force to one-percent change in slip ratio may be represented by Expression 15 below individually for each of the front and rear axles.

$$\frac{\Delta Fy}{\Delta \kappa} = \qquad \text{(Expression 15)}$$

$$\left( \begin{array}{l} Fy0 \cdot (\cos(Rcy1 \cdot \tan^{-1}(Rby1 \cdot \cos(\tan^{-1}(Rby2 \cdot \alpha)) \cdot Rvy5 \cdot \kappa)) - \\ \cos(Rcy1 \cdot \tan^{-1}(Rby1 \cdot \cos(\tan^{-1}Rby2 \cdot \alpha)) \cdot Rvy5 \cdot (\kappa + \Delta \kappa))) \end{array} \right) \bigg/ \Delta \kappa$$

Figure 6:
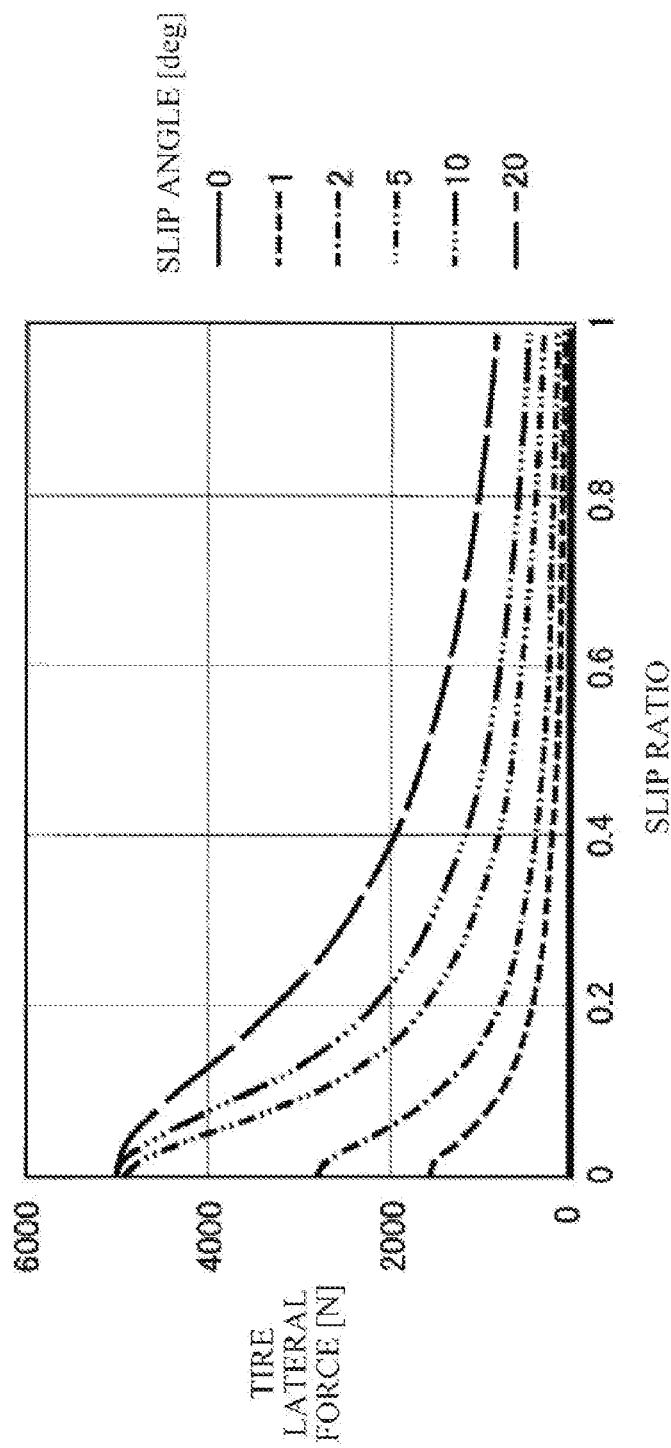
FIG. 6 is a diagram illustrating a correlation of a tire lateral force to a slip ratio.

FIG. 6 is a diagram illustrating a correlation of a tire lateral force to a slip ratio.

In FIG. 6, the horizontal axis represents the slip ratio, and the vertical axis represents the tire lateral force.

As illustrated in FIG. 6, the tire lateral force Fy may increase in accordance with an increase in the slip angle, and may decrease in accordance with an increase in the slip ratio.

Figure 7:
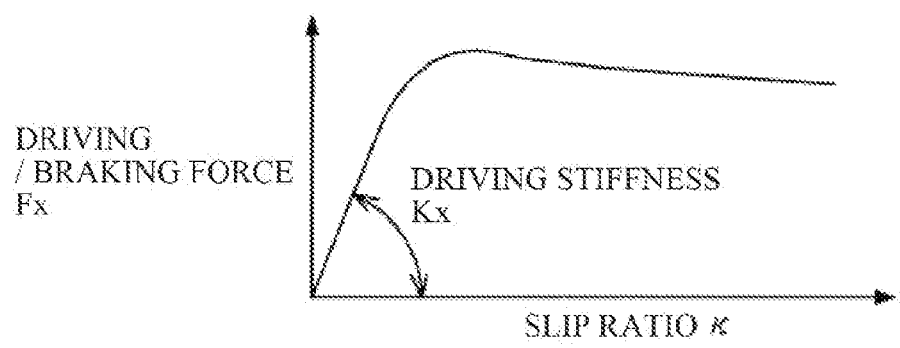
FIG. 7 is a diagram illustrating a concept of driving stiffness of a tire.

FIG. 7 is a diagram illustrating a concept of driving stiffness of a tire.

In FIG. 7, the horizontal axis represents a slip ratio, and the vertical axis represents a driving/braking force of a tire.

As illustrated in FIG. 7, a driving/braking force may change linearly with respect to the slip ratio in a region where the slip ratio is relatively small.

A change rate of the driving/braking force to the slip ratio, i.e., a slope of the diagram, in such a region may represent driving stiffness for driving and braking stiffness for braking.

Typically, the driving stiffness may often be almost the same as the braking stiffness.

Figure 8:
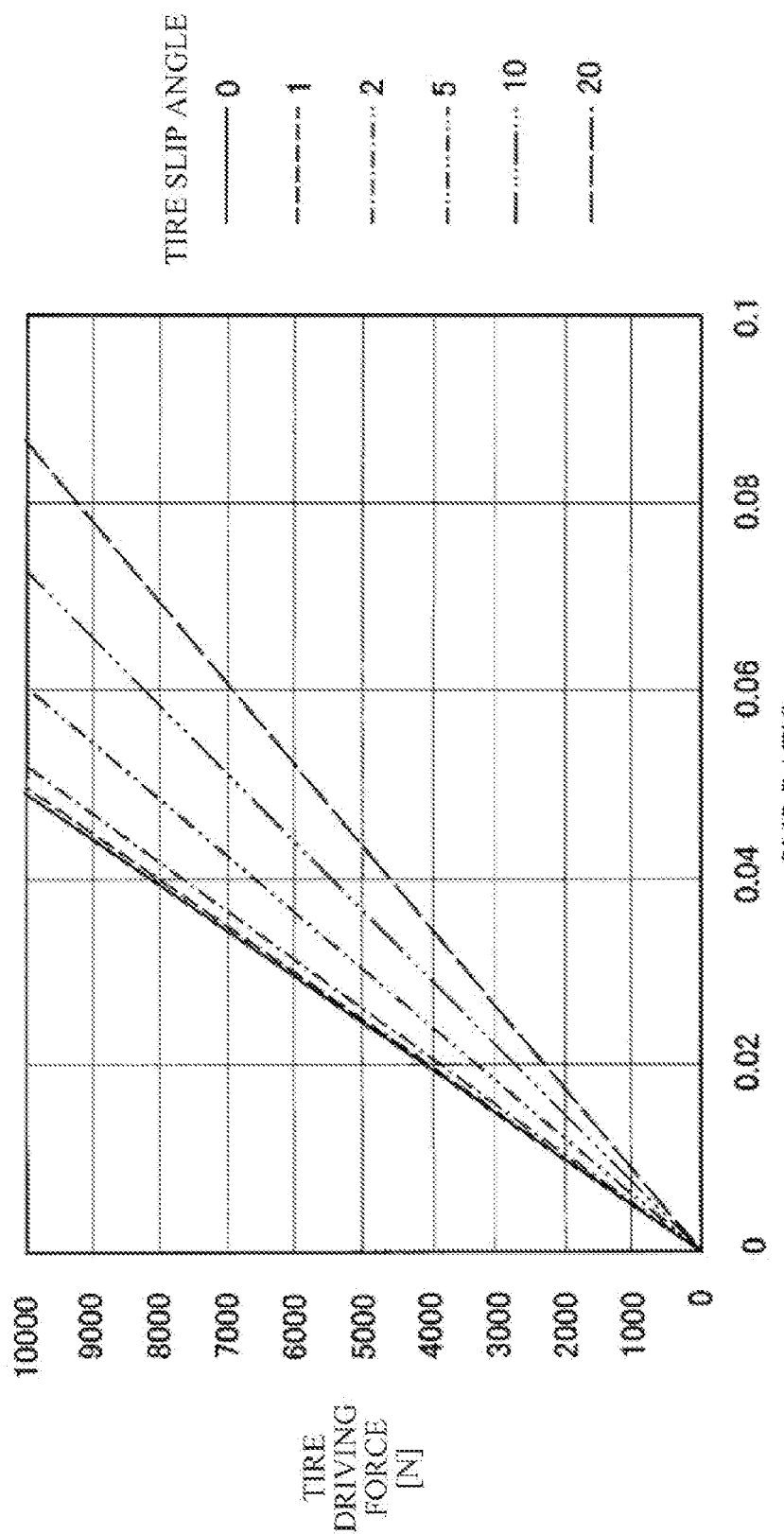
FIG. 8 is a diagram illustrating a correlation between a slip ratio and a tire driving force for different slip angles.

FIG. 8 is a diagram illustrating a correlation between a slip ratio and a tire driving force for different slip angles.

In FIG. 8, the horizontal axis represents the slip ratio, and the vertical axis represents the tire driving force.

FIG. 8 includes diagrams for the slip angles of 0 degree, 1 degree, 2 degrees, 5 degrees, 10 degrees, and 20 degrees.

Figure 9:
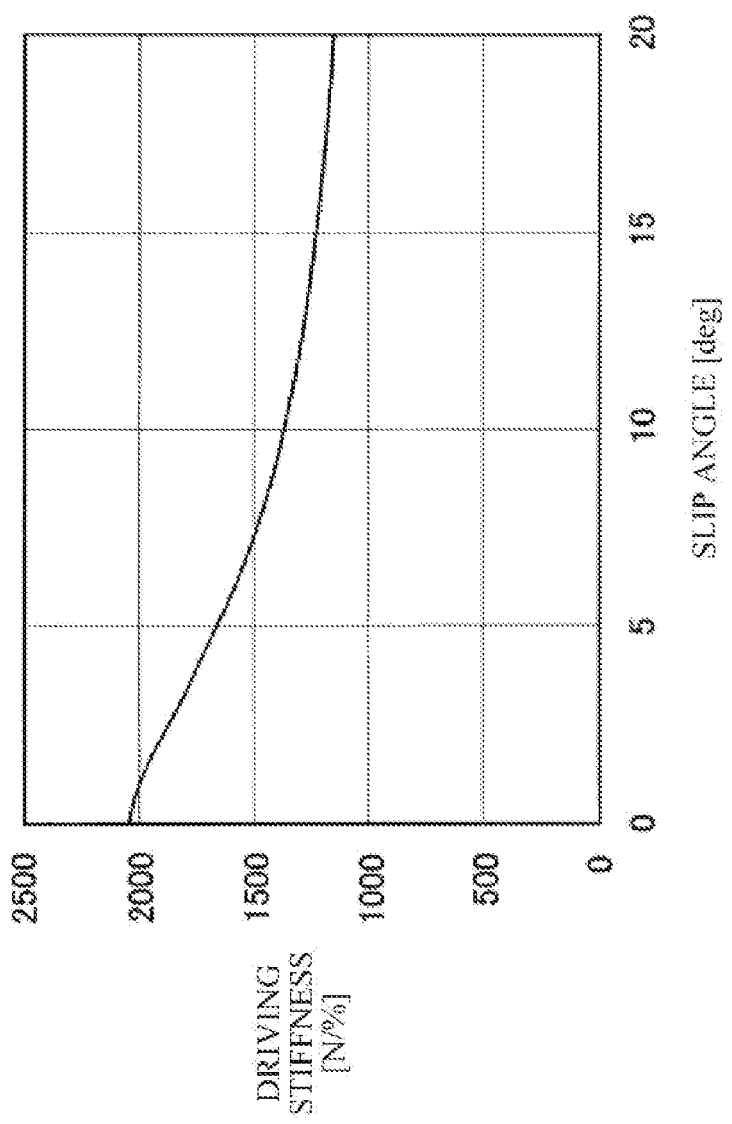
FIG. 9 is a diagram illustrating a correlation between a slip angle of a tire and driving stiffness of the tire.

FIG. 9 is a diagram illustrating a correlation between a slip angle of a tire and driving stiffness of the tire.

In FIG. 9, the horizontal axis represents the slip angle, and the vertical axis represents the driving stiffness.

As illustrated in FIGS. 8 and 9, the driving stiffness may tend to decrease in accordance with an increase in the slip angle.

Driving stiffness Kx of a tire may be represented by Expression 16 below.

$$Kx = Kx0 \cdot \cos(Rcx1 \cdot \tan^{-1}(Rbx1 \cdot \cos(\tan^{-1}(Rbx2 \cdot \kappa0)) \cdot \alpha)) \quad \text{(Expression 16)}$$

where:
Rbx1, Rbx2, and Rcx1 are parameter values of Magic Formula; and
Kx0 is driving stiffness at the time when a slip angle is zero.

In addition, a ratio between driving stiffness Kxf of the front wheel FW and driving stiffness Kxr of the rear wheel RW, i.e., a front-rear ratio of driving stiffness, may be defined by Expression 17 below.

$$R_{Kx} = Kxr/Kxf \qquad \text{(Expression 17)}$$

The slip ratio and the driving force of each of the front and rear wheels that allows for addition of a target yaw moment Mz and also allows the vehicle 1 to maintain a total driving force (Fxf+Fxr) may be represented by Expressions 18 to 23 below.

$$Mz = dFy_f \cdot l_f - dFy_r \cdot l_r \quad \text{(Expression 18)}$$

$$\begin{cases} dFy_f = \dfrac{\Delta Fy_f}{\Delta \kappa_f} \cdot d\kappa_f \\ dFy_r = \dfrac{\Delta Fy_r}{\Delta \kappa_r} \cdot d\kappa_r \end{cases} \quad \text{(Expressions 19 and 20)}$$

$$\dfrac{d\kappa_r}{d\kappa_f} = -R_{\kappa x} \quad \text{(Expression 21)}$$

$$\therefore \begin{cases} d\kappa_f = \dfrac{Mz}{\dfrac{\Delta Fy_f}{\Delta \kappa_f} \cdot l_f + R_{\kappa x} \dfrac{\Delta Fy_r}{\Delta \kappa_r} \cdot l_r} \\ d\kappa_r = R_{\kappa x} \cdot d\kappa_f \end{cases} \quad \text{(Expression 22)}$$

$$Fx = Kx \times (\kappa + d\kappa) \quad \text{(Expression 23)}$$

(individually for each of front and rear axles)

It is to be noted that if the change in the driving force described above makes the driving force after the change exceed Fx=0 (a state where a tire lateral force is maximized), a control that is to increase the tire lateral force may instead reduce the tire lateral force. For such a reason, the driving force after the change may be limited not to exceed Fx=0.

Next, a description is given of setting of a target yaw moment (an additional yaw moment) to be added by a driving/braking force control when the vehicle 1 turns.

The additional yaw moment may be calculated by Expressions 24 and 25 below based on, for example, the steering-wheel angle $\theta_H$ detected by the steering angle sensor 133, the yaw rate $\gamma$ detected by the yaw rate sensor 135, and the lateral acceleration detected by the acceleration sensor 134.

$$M_{z\theta} = -K_\gamma \cdot \gamma + K_y \cdot \ddot{y}_e +$$
$$K_\theta \cdot \theta_H M_{Vz\theta} = K_{Vz\theta} \cdot K_{Vv1} \cdot K_{Vvh} \cdot K_{V\beta} \cdot M_{z\theta} \quad \text{(Expressions 24 and 25)}$$

where:
$M_{z\theta}$ and $M_{Vz\theta}$ are each an additional yaw moment [N/m];
$K_{Vz\theta}$ is a gain to determine an assist amount (=1);
$K_{Vv1}$ is a vehicle-speed-and-lateral-acceleration-sensitive gain (at a low speed);
$K_{Vvh}$ is a vehicle-speed-and-lateral-acceleration-sensitive gain (at a high speed);
$K_{V\beta}$ is a vehicle-body-slip-angle-and-speed-sensitive gain;
$K\gamma$ is a yaw-rate-sensitive gain;
$\gamma$ is a yaw rate [rad/s];
$K_y$ is a lateral-acceleration-deviation-sensitive gain;
$\ddot{y}_e$ is a lateral acceleration deviation [m/s$^2$];
$K_\theta$ is a steering-angle-sensitive gain; and
$\theta_H$ is a steering-wheel angle [rad].

Here the lateral acceleration deviation may be set as represented by Expression 26 below.

$$\ddot{y}_e = \ddot{y} - \ddot{y}_r \quad \text{(Expression 26)}$$

where:
$\ddot{y}$ is actual lateral acceleration [m/s$^2$]; and
$\ddot{y}_r$ is reference lateral acceleration [m/s$^2$].

In order to prevent an excessive rotation moment from being generated upon great steering on a road having a low coefficient of friction, the reference lateral acceleration may be set as represented by Expression 27 below.

$$\ddot{y}_r = \dfrac{1}{1 + T_y \cdot S} \ddot{y}_{s\_s} \quad \text{(Expression 27)}$$

where:
$T_y$ is a lateral acceleration first-order lag time constant [s] (=0.02);
S is a differential operator; and
$\ddot{y}_{s\_s}$ is a signed reference lateral acceleration (with no delay) [m/s$^2$].

Signless reference lateral acceleration $\ddot{y}_{s\_1}$ resulting from linear calculation with respect to the steering-wheel angle $\theta_H$ may be represented by Expression 28 below.

$$\ddot{y}_{s\_1} = G_y \cdot |\theta_H| \quad \text{(Expression 28)}$$

where:
$G_y$ is a lateral acceleration/steering-wheel angle gain; and
$\ddot{y}_{s\_1}$ is a signless reference lateral acceleration [m/s$^2$] resulting from linear calculation with respect to a steering-wheel angle.

Pseudo-lateral acceleration that saturates the reference lateral acceleration may be represented by Expression 29 below.

$$\begin{cases} \ddot{y}_x = G_y \cdot \theta_{H\_Max} \dfrac{10 - |\ddot{y}|}{10} + |\ddot{y}| & \cdots (|\ddot{y}|) < 10) \\ \ddot{y}_x = 10 & \cdots (|\ddot{y}|) \geq 10) \end{cases} \quad \text{(Expression 29)}$$

where:
$\ddot{y}_s$ is pseudo-lateral acceleration [m/s$^2$] that saturates reference lateral acceleration; and
$\theta_H$ max is a maximum steering-wheel angle [rad] (=540 degrees).

Figure 10:
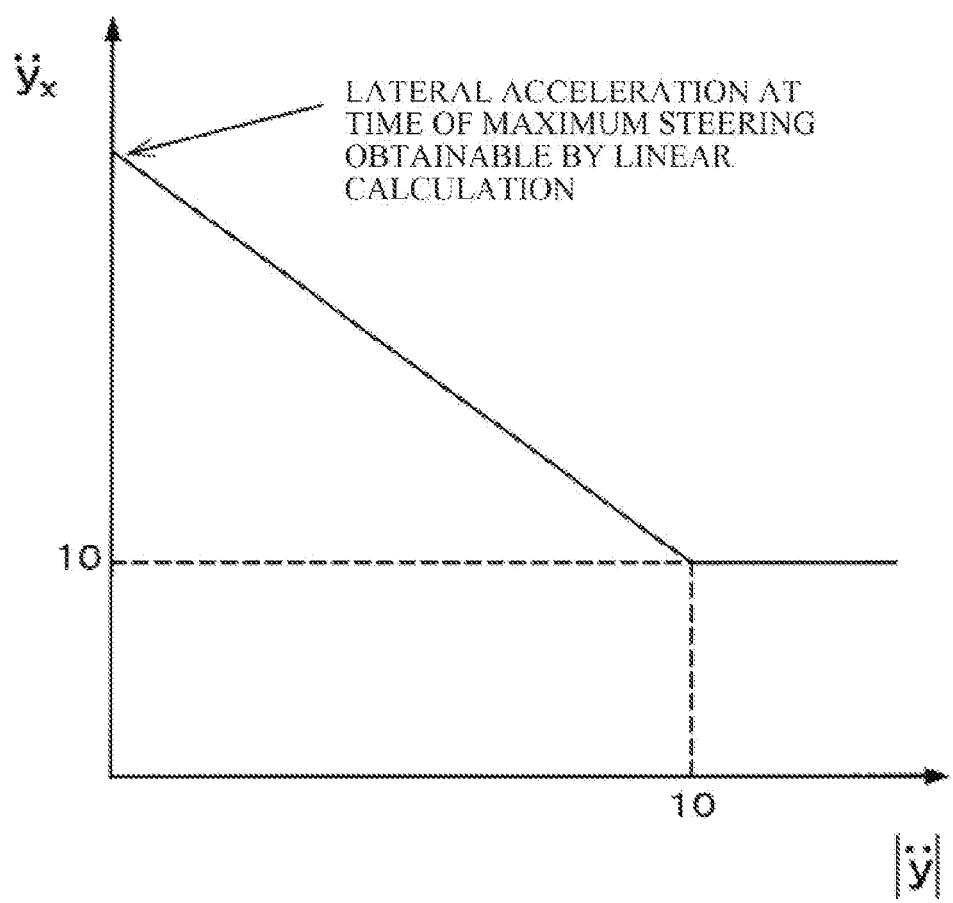
FIG. 10 is a diagram illustrating a correlation between an absolute value of actual lateral acceleration and pseudo-lateral acceleration that saturates reference lateral acceleration.

FIG. 10 is a diagram illustrating a correlation between an absolute value of actual lateral acceleration and pseudo-lateral acceleration that saturates reference lateral acceleration.

Signless reference lateral acceleration saturated by the pseudo-lateral acceleration that saturates the reference lateral acceleration may be represented by Expression 30 below.

$$\begin{cases} \ddot{y}_{s\_m} = \ddot{y}_{s\_1} - \ddot{y}_d & \cdots (\ddot{y}_d > 0) \\ \ddot{y}_{s\_m} = \ddot{y}_{s\_1} & \cdots (\ddot{y}_d \leq 0) \end{cases} \quad \text{(Expression 30)}$$

$$\ddot{y}_d = \ddot{y}_{s\_1} - \ddot{y}_x$$

where $\ddot{y}_{s\_m}$ is signless reference lateral acceleration [m/s$^2$] saturated by $\ddot{y}^x$.

The signed version thereof may be represented by Expressions 31 and 32 below.

$$\begin{cases} \ddot{y}_{s\_s} = \ddot{y}_{s\_m} & \cdots (\theta_H \geq 0) \\ \ddot{y}_{s\_s} = -\ddot{y}_{s\_m} & \cdots (\theta_H < 0) \end{cases} \quad \text{(Expression 31 and 32)}$$

A lateral acceleration/steering-wheel angle gain $G_y$ may be represented by Expression 33 below.

$$G_y = \dfrac{1}{1 + A \cdot V^2} \cdot \dfrac{V^2}{l} \cdot \dfrac{1}{n} \quad \text{(Expression 33)}$$

where:
- A is a stability factor [s²/m²] (for example, 0.0022);
- V is a vehicle speed [m/s] (=four-wheel average wheel speed);
- l is a wheel base [m] (for example, 2.54); and
- n is a steering gear ratio (for example, 13).

Figure 11:
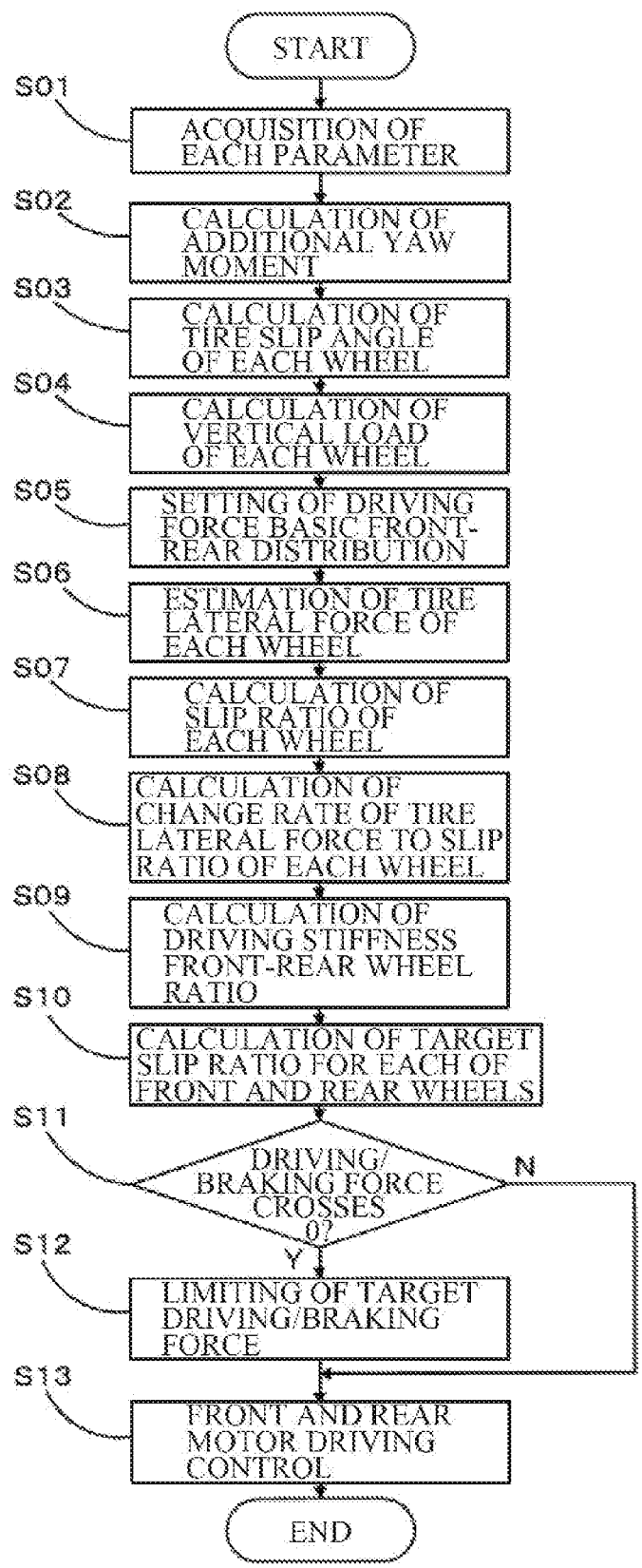
FIG. 11 is a flowchart illustrating a process to be performed by the driving/braking force control apparatus according to one example embodiment when a driving force control is performed to generate an additional yaw moment in a vehicle.

FIG. 11 is a flowchart illustrating a process to be performed by the driving/braking force control apparatus according to the first example embodiment when a driving force control is performed to generate an additional yaw moment in a vehicle.

The process is described below in order of steps.

[Step S01: Acquisition of Each Parameter]

The driving control unit 130 may acquire parameters to be used in the subsequent process, based on, for example, outputs of the respective sensors.

Thereafter, the process may proceed to step S02.

[Step S02: Calculation of Additional Yaw Moment]

The driving control unit 130 may calculate an additional yaw moment to be added by the driving/braking force control with use of Expressions 24 and 25 above.

Thereafter, the process may proceed to step S03.

[Step S03: Calculation of Tire Slip Angle of Each Wheel]

The driving control unit 130 may calculate the tire slip angle of each of the front wheel FW and the rear wheel RW with use of Expressions 2 and 3 above.

Thereafter, the process may proceed to step S04.

[Step S04: Calculation of Vertical Load of Each Wheel]

The driving control unit 130 may calculate the vertical load of each of the right and left front wheels FW and the right and left rear wheels RW with use of Expressions 4 to 9 above.

Thereafter, the process may proceed to step S05.

[Step S05: Setting of Driving Force Basic Front-Rear Distribution]

The driving control unit 130 may set driving force basic front-rear distribution, for example, with use of the driving force distribution diagram illustrated in FIG. 5 or a map generated based on such a driving force distribution diagram. The driving force basic front-rear distribution may be driving force front-rear distribution where an additional moment is zero.

Thereafter, the process may proceed to step S06.

[Step S06: Estimation of Tire Lateral Force of Each Wheel]

The driving control unit 130 may calculate, or estimate, the tire lateral force Fy of each of the front wheel FW and the rear wheel RW with use of Expessions 13 and 14 above.

Thereafter, the process may proceed to step S07.

[Step S07: Calculation of Slip Ratio of Each Wheel]

The driving control unit 130 may calculate the slip ratio κ of the tire of each of the front wheel FW and the rear wheel RW with use of Expression 12 above.

Thereafter, the process may proceed to step S08.

[Step S08: Calculation of Change Rate of Tire Lateral Force to Slip Ratio of Each Wheel]

The driving control unit 130 may calculate a change rate of the tire lateral force to a change of the slip ratio per unit amount individually for each of the front wheel FW and the rear wheel RW with use of Expression 15 above. The unit amount may be 1%, for example.

Thereafter, the process may proceed to step S09.

[Step S09: Calculation of Driving Stiffness Front-Rear Wheel Ratio]

The driving control unit 130 may calculate a front-rear wheel ratio of driving stiffness for driving and of braking stiffness for regenerative braking with use of Expression 17 above.

Thereafter, the process may proceed to step S10.

[Step S10: Calculation of Target Slip Ratio for Each of Front and Rear Wheels]

The driving control unit 130 may calculate, with use of Expressions 18 to 23 above, a target slip ratio of a tire of each of the front wheel FW and the rear wheel RW for achieving the additional yaw moment calculated in step S02. Conversion to a target driving force may be performed with use of the driving stiffness Kx.

Thereafter, the process may proceed to step S11.

[Step S11: Determination as to Whether Driving/Braking Force Crosses 0]

The driving control unit 130 may determine whether the driving/braking force of any of the front wheel FW and the rear wheel RW crosses 0 (zero) upon changing the driving/braking force to obtain the slip ratio of each of the front wheel FW and the rear wheel RW calculated in step S10. Whether the driving/braking force of any of the front wheel FW and the rear wheel RW crosses 0 may be, for example, whether the driving/braking force shifts from the driving side to the braking side or whether the driving/braking force shifts from the braking side to the driving side.

If the driving/braking force crosses 0, the process may proceed to step S12, and otherwise, the process may proceed to step S13.

[Step S12: Limiting of Target Driving/Braking Force]

The driving control unit 130 may limit the driving/braking force of the wheel on a side where a driving/braking force crosses 0, out of the front wheel FW and the rear wheel RW.

After limiting the target driving/braking force, the process may proceed to step S13.

[Step S13: Front and Rear Motor Driving Control]

The driving control unit 130 may give commands to the front inverter 110 and the rear inverter 120. Upon driving, the driving control unit 130 may thereby drive the front motor 10 and the rear motor 20 while controlling the output axis rotation speeds of the front motor 10 and the rear motor in such a manner that the respective slip ratios of the front wheel FW and the rear wheel RW become the target slip ratios set in step S10 upon driving.

Upon braking, the driving control unit 130 may cause the front motor 10 and the rear motor to perform regeneration while controlling the output axis rotation speeds of the front motor 10 and the rear motor 20 in such a manner that the respective slip ratios of the front wheel FW and the rear wheel RW become the target slip ratios set in step S10.

Thereafter, the series of processes may be ended.

Figure 12A:
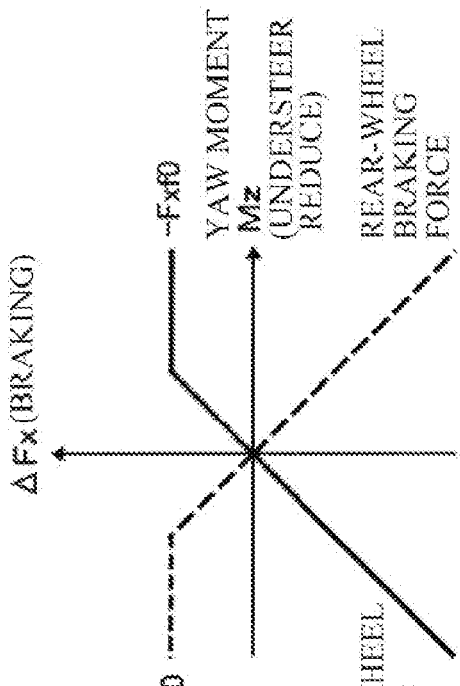
FIGS. 12A and 12B are diagrams illustrating an example of a yaw moment to be added by a driving force control, a driving/braking force of a front wheel, and a driving/braking force of a rear wheel in the driving/braking force control apparatus according to one example embodiment.
Figure 12B:
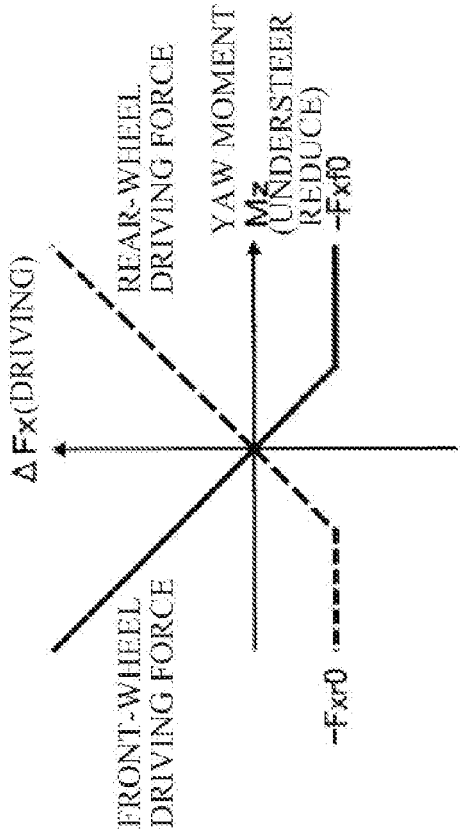

FIGS. 12A and 12B are diagrams illustrating an example of a yaw moment to be added by a driving force control, a driving/braking force of a front wheel, and a driving/braking force of a rear wheel.

FIG. 12A illustrates the front-wheel driving force and the rear-wheel driving force at the time of driving. FIG. 12B illustrates the front-wheel braking force and the rear-wheel braking force at the time of braking performed with use of the regenerative brake.

In each of FIGS. 12A and 12B, the horizontal axis represents the yaw moment Mz, and an effect of reducing understeer may be higher toward the right side.

As illustrated in FIGS. 12A and 12B, it may be possible to generate a yaw moment in a direction of reducing understeer by generating a difference in a lateral force between the front wheel and the rear wheel. Such a difference in the lateral force may be generated by reducing the driving/braking force of the front wheel FW to increase a generatable lateral force and increasing the driving/braking force of the rear wheel RW to reduce a generatable lateral force.

Meanwhile, it may be possible to generate a yaw moment in a direction of suppressing oversteer by generating a difference in a lateral force between the front wheel and the rear wheel in an opposite manner. Such a difference in the lateral force may be generated by increasing the driving/braking force of the front wheel FW to reduce the generatable lateral force and reducing the driving/braking force of the rear wheel RW to increase the generatable lateral force.

Regarding both the braking force and the driving force, in principle, for example, the driving/braking force of one of the front wheel FW and the rear wheel RW may be reduced in accordance with an increase in the driving/braking force of the other, not to change the total driving force or the total braking force of the vehicle by changing the driving force distribution.

However, as described above, when the driving/braking force of any of the front wheel FW and the rear wheel RW becomes 0 (zero), a control may be performed to maintain the tire longitudinal force at 0 without inverting the sign of the driving/braking force, that is, without changing driving to braking or braking to driving.

Figure 13:
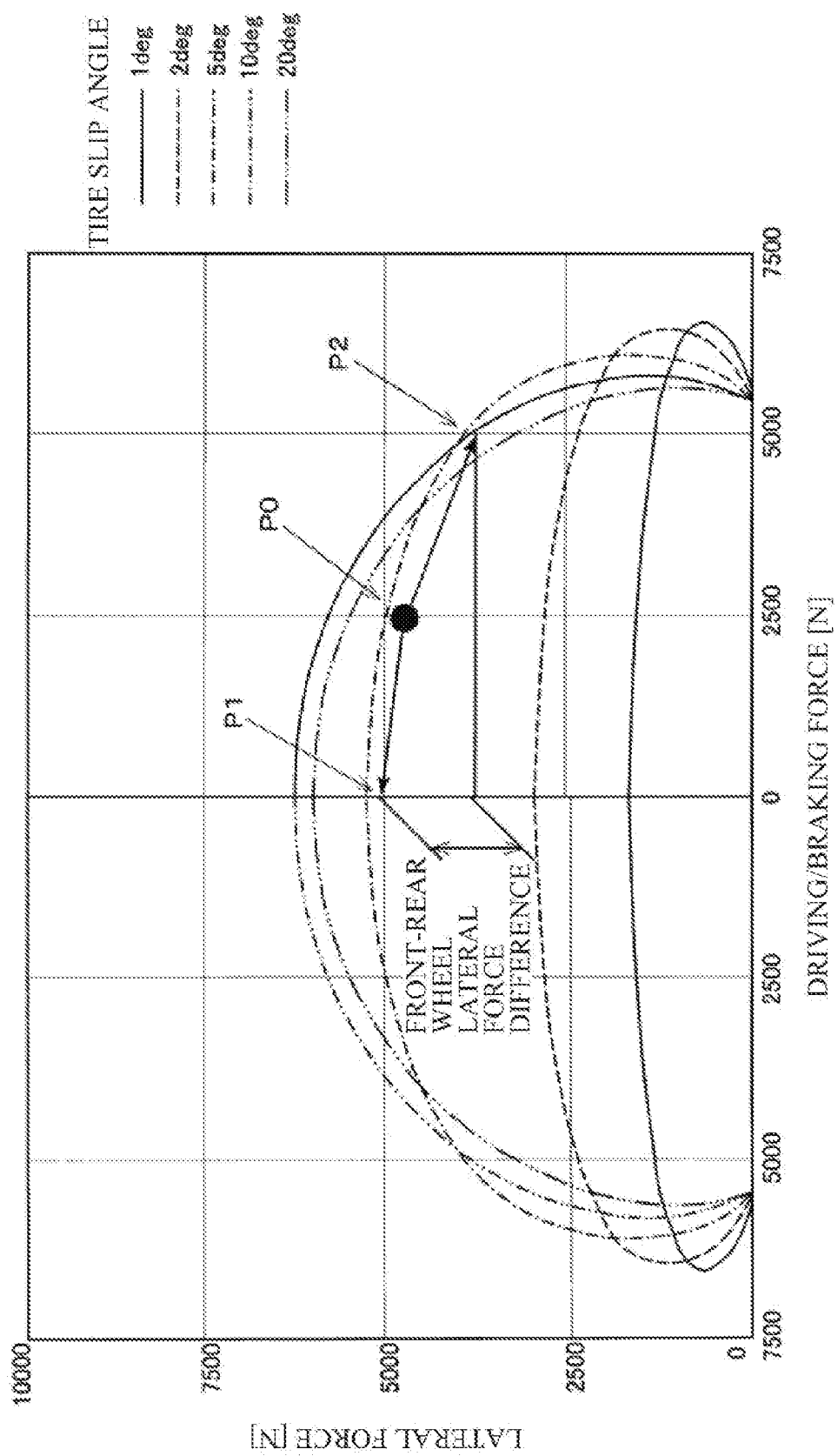
FIG. 13 is a diagram on which a driving/braking force and a lateral force generated at a tire are plotted for each slip angle.

FIG. 13 is a diagram on which a driving/braking force and a lateral force generated at a tire are plotted for each slip angle.

In FIG. 13, the horizontal axis represents the driving/braking force (tire longitudinal force), and the vertical axis represents the tire lateral force.

As illustrted in FIG. 13, the diagram on which the driving/braking force and the lateral force are plotted (a tire force characteristic diagram) may change depending on the slip angle of the tire.

A concept typically known as a friction circle may be a circle connecting the outermost edges of such diagrams for different slip angles.

However, in an actual situation, due to presence of a yaw inertia of a vehicle body, there may be a response delay in time in transition of the slip angle of the tire from the current slip angle to a slip angle that allows for obtainment of the tire generation force at the friction circle limit.

If a control is performed based on the friction circle limit, ignoring the above-described point, for example, when an excessive slip occurs due to an excessive driving/braking force of the tire and, for example, a slip occurs on the driving side, suppression of a slip may be to be performed, for example, by performing intervention by a braking control with use of the friction brake.

This can lead to a concern such as an energy loss or occurrence of a noise due to the operation of the friction brake.

To address this, according to the first example embodiment, the slip angle $\alpha_f$ of the front wheel FW and the slip angle $\alpha_r$ of the rear wheel RW may be calculated, and the target driving/braking force may be set depending on the characteristics of the tires corresponding to the current slip angles $\alpha_f$ and $\alpha_r$. The desired yaw moment may thus be applied to the vehicle 1 by efficiently utilizing the change in the tire force generated at the current slip angles $\alpha_f$ and $\alpha_r$ of the tires. It is therefore possible to improve driving stability and turning performance.

For example, when, in FIG. 13, the slip angle of the rear wheel RW is 5 degrees, and the driving force and the lateral force of each of the front wheel FW and the rear wheel RW are those at a position P0 (where the driving force is 2500 N), the driving force and the lateral force of the front wheel FW may be changed to those at a position P1 (where the driving force is 0), and the driving force and the lateral force of the rear wheel RW may be changed to those at a position P2 (which is a point to be in contact with the tire force characteristic diagram for the slip angle of 5 degrees and where the driving force is 5000 N). This makes it possible to generate a front-rear wheel lateral force difference indicated in FIG. 13 without changing the total driving force of the vehicle 1, which makes it possible to apply a desired additional yaw moment without performing intervention by a control such as a braking control with use of the friction brake for the vehicle 1.

According to the first example embodiment described above, the following effects may be achieved.

(1) The respective change rates of the tire lateral forces Fy to the slip ratios κ may be determined based on the current lateral force Fy and the current slip angle $\alpha_f$ of the tire of the front wheel FW and the current lateral force Fy and the current slip angle $\alpha_r$ of the tire of the rear wheel RW. An output allocation ratio between the front motor 10 and the rear motor 20 may be controlled on the determined change rates of the tire lateral forces Fy to the slip ratios κ. The output allocation ratio may be an allocation ratio of a driving force or an allocation ratio of a braking force, for example. This makes it possible to perform an appropriate driving/braking force distribution control reflecting the current slip angles and the current tire lateral forces in a vehicle in an actual situation where a yaw moment of a part such as a vehicle body is present and where the vehicle body and the slip angle of the tire may not immediately change.

It is thus possible to prevent a situation from occurring where the tire generation force exceeds its limit value due to an excessive driving/braking force distribution control and where, for example, intervention by a braking control with use of the friction brake is to be performed. Accordingly, it is possible to reduce energy loss in the vehicle 1 and to prevent a noise or a strange feeling due to the operation of the friction brake from occurring.

(2) The target slip ratio of the front wheel FW and the target slip ratio of the rear wheel RW may be set in the control of the output allocation ratio, and the output shaft rotation speed of the front motor 10 and the output shaft rotation speed of the rear motor 20 may be controlled in such a manner that an actual slip ratio of the front wheel FW and an actual slip ratio of the rear wheel RW match the target slip ratio of the front wheel FW and the target slip ratio of the rear wheel RW, respectively. This makes it possible to appropriately control the slip ratio κ of each of the front wheel FW and the rear wheel RW by controlling the rotation speeds of the electric motors, thus making it possible to generate a desired additional yaw moment by a relatively simple control and with higher accuracy.

(3) Driving/braking force distribution may be controlled in such a manner that the sum of a longitudinal force of the front wheel FW and a longitudinal force of the rear wheel RW match a predetermined requested longitudinal force in a region up to a point where the absolute value of one of the longitudinal force of the front wheel FW and the longitudinal force of the rear wheel RW reaches 0 (zero). This makes it possible to prevent the total driving force or the total braking force of the vehicle 1 from being changed by the front-rear wheel braking/driving force distribution control and to secure drivability (easiness in driving) of the vehicle 1.

(4) Inversion of a sign of the longitudinal force of the front wheel FW or the longitudinal force of the rear wheel RW to be caused by a change in the output allocation ratio between the front motor 10 and the rear motor 20 may be disabled. For example, in order to increase the tire lateral force Fy, the driving force (or the braking force) Fx of any of the front and rear wheels may be reduced. As a result, the longitudinal force can be inverted in sign to generate a braking force (or a driving force), which can reduce the tire lateral force Fy, which is contrary to the initial intention. By disabling the inversion of the sign of the longitudinal force of the front wheel FW or the longitudinal force of the rear wheel RW to be caused by the change in the output allocation ratio between the front motor 10 and the rear motor 20, it is possible to prevent such a situation from occurring.

Second Example Embodiment

Next, a description is given of a driving/braking force control apparatus according to a second example embodiment of the disclosure.

In each example embodiment described below, components similar to those in the foregoing example embodiment are denoted with the same reference numerals as those in the foregoing example embodiment. Descriptions for such components are omitted and, for example, differences may be described below.

In the second example embodiment, the change rate of the tire lateral force to the slip ratio of each wheel may be determined with use of map values of a slip angle and a slip ratio set in advance for each lateral acceleration of a vehicle, instead of sequentially calculating the change rate by numerical calculation using the tire model as in the first example embodiment.

Figure 14:
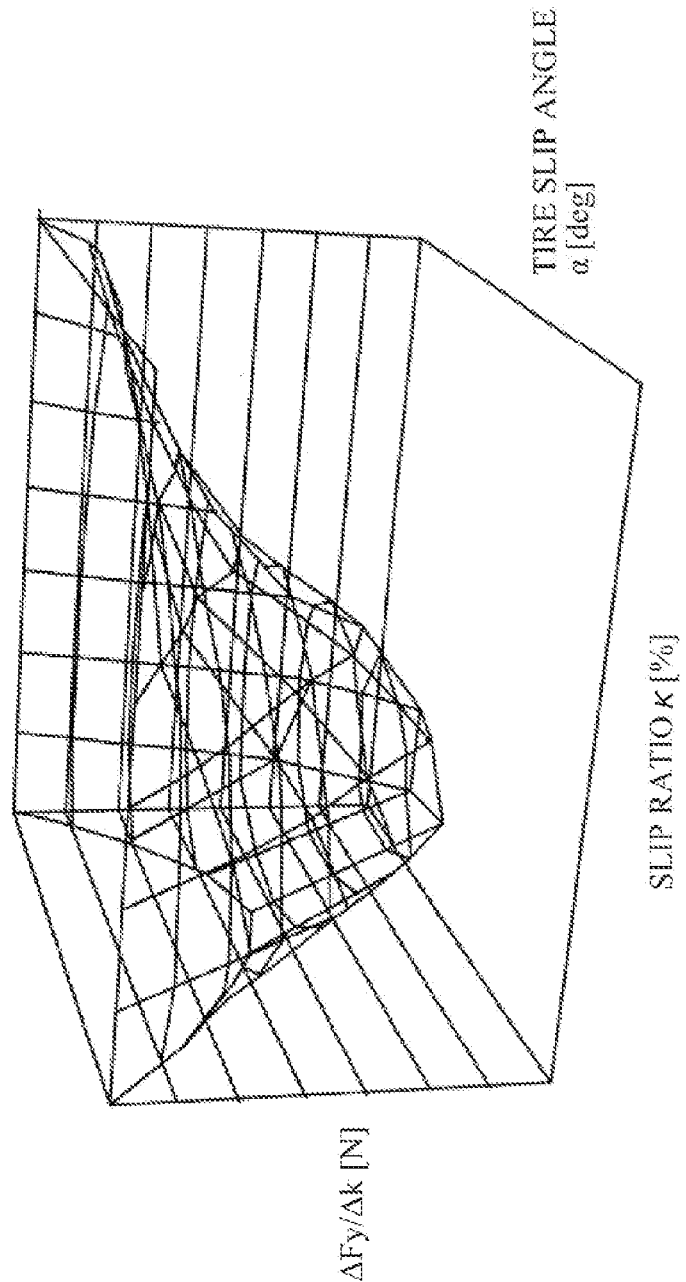
FIG. 14 is a diagram illustrating an example of a map of a change rate of a tire lateral force to a slip ratio in a driving/braking force control apparatus according to one example embodiment of the disclosure.

FIG. 14 is a diagram illustrating an example of a map of a change rate of a tire lateral force to a slip ratio.

As illustrated in FIG. 14, the map may be a three-dimensional map in which the slip angle and the slip ratio of a tire are inputted and the change rate of the tire lateral force to the slip ratio is outputted or read out.

Two or more such maps may be provided depending on the change in lateral acceleration.

In addition, lateral acceleration with no map set may be determined, for example, by performing interpolation such as linear interpolation on the change rate of the tire lateral force to the slip ratio read from the provided maps.

According to the second example embodiment described above, effects similar to those of the first example embodiment described above are achievable. In addition, as compared with a case where the change rate of the tire lateral force to the slip ratio is calculated in real time with use of a device such as a processor mounted in the vehicle, it is possible to reduce the calculation load of the driving control unit 130 and also to improve control responsiveness.

Third Example Embodiment

Next, a description is given of a driving/braking force control apparatus according to a third example embodiment of the disclosure.

In the third example embodiment, the setting of the driving/braking force may be changed from that in the first example embodiment as follows.

Figure 15A:
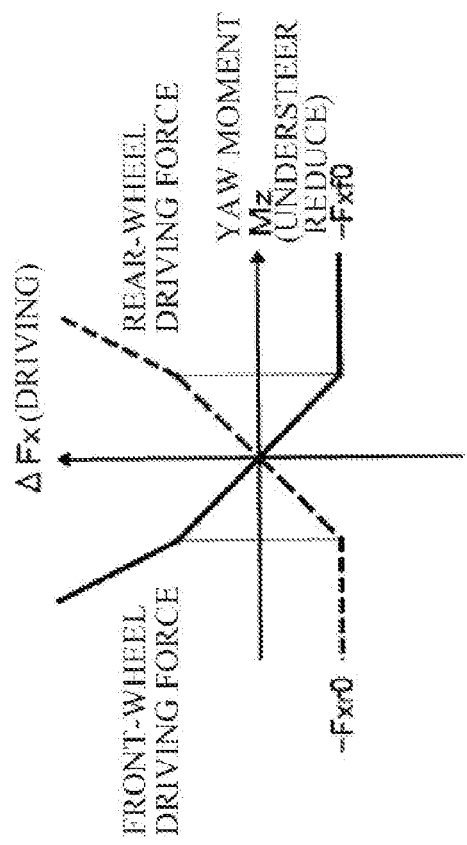
FIGS. 15A and 15B are diagrams illustrating an example of a yaw moment to be added by a driving force control, a driving/braking force of a front wheel, and a driving/braking force of a rear wheel in a driving/braking force control apparatus according to one example embodiment of the disclosure.
Figure 15B:
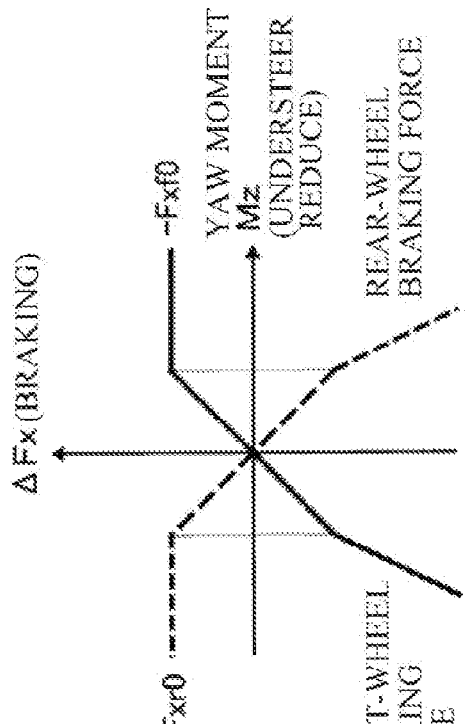

FIGS. 15A and 15B are diagrams illustrating an example of a yaw moment to be added by a driving force control according to the third example embodiment, a driving/braking force of a front wheel, and a driving/braking force of a rear wheel.

In the third example embodiment, in the setting of the target driving/braking forces of the front wheel FW and the rear wheel RW, when the driving/braking force of one of the front wheel FW and the rear wheel RW is to cross 0 (zero), the change rate of the driving force change amount ΔFx to the additional yaw moment Mz of the other wheel may be increased.

According to the third example embodiment described above, effects similar to those of the first example embodiment described above are achievable. In addition, even when the changing of the driving/braking force of one of the front wheel FW and the rear wheel RW is limited due to that the driving/braking force is to cross 0, it is possible to secure the amount of a yaw moment actually generated at the vehicle body by increasing the change amount of the driving/braking force of the other.

[Modifications]

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof (1) Respective configurations of the vehicle, the driving apparatus of the vehicle, and the driving/braking force control apparatus are not limited to those of the example embodiments described above, and may be appropriately modified.

For example, an operation achieved by a single unit in the example embodiments described above may be achieved dividedly by two or more components. In contrast, an operation achieved by two or more components may be achieved collectively by a single unit.

(2) The vehicle, the tire model, and the numerical expression used in the example embodiments are mere examples. An embodiment of the disclosure is not limited thereto. The vehicle, the tire model, and the numerical expression may be appropriately modified.

(3) In the above-described example embodiments, driving and braking related to the right and left front wheels may be performed by a single front motor, and driving and braking related to the right and left rear wheels may be performed by a single rear motor. However, an embodiment of the disclosure is not limited thereto. For example, an embodiment of the disclosure may be applied to a vehicle including a motor generator individually for each wheel. Such a motor generator may typically be an in-wheel motor.

(4) In the above-described example embodiments, the driving/braking force control apparatus may control the front-rear distribution of both the driving force and the braking force of the vehicle. However, an embodiment of the disclosure is not limited thereto. The driving/braking force control apparatus may be configured to control the front-rear distribution of one of the driving force and the braking force.

(5) In the above-described example embodiments, the vehicle may be a battery electric vehicle, for example. However, an embodiment of the disclosure is not limited thereto. An embodiment of the disclosure may be applied to any other electric vehicle such as a fuel cell electric vehicle or an engine-electric series-hybrid vehicle.

As described above, according to an embodiment of the disclosure, it is possible to provide a driving/braking force control apparatus that makes it possible to perform an appropriate driving/braking force control reflecting a state of a tire.

The driving control unit 130 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the driving control unit 130. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the driving control unit 130 illustrated in FIG. 1.

The invention claimed is:

1. A driving/braking force control apparatus comprising:
a front-wheel longitudinal force generator configured to generate a longitudinal force of a front wheel of a vehicle;
a rear-wheel longitudinal force generator configured to generate a longitudinal force of a rear wheel of the vehicle;
a tire slip angle output unit configured to output a tire slip angle of the front wheel and a tire slip angle of the rear wheel based on a turning state of the vehicle;
a tire lateral force output unit configured to output a tire lateral force of the front wheel and a tire lateral force of the rear wheel based on the turning state of the vehicle;
a slip ratio output unit configured to output a slip ratio of the front wheel and a slip ratio of the rear wheel based on the tire slip angle of the front wheel, the tire slip angle of the rear wheel, the tire lateral force of the front wheel, and the tire lateral force of the rear wheel;
a tire lateral force change rate output unit configured to output a change rate of the tire lateral force of the front wheel to the slip ratio of the front wheel and a change rate of the tire lateral force of the rear wheel to the slip ratio of the rear wheel;
a target yaw moment setting unit configured to set a target value of an additional yaw moment to be applied to the vehicle; and
a driving/braking force distribution control unit configured to perform a control of an output allocation ratio between the front-wheel longitudinal force generator and the rear-wheel longitudinal force generator based on the target value of the additional yaw moment, the change rate of the tire lateral force of the front wheel to the slip ratio of the front wheel, and the change rate of the tire lateral force of the rear wheel to the slip ratio of the rear wheel.

2. The driving/braking force control apparatus according to claim 1, wherein
the front-wheel longitudinal force generator and the rear-wheel longitudinal force generator each comprise an electric motor, and
the driving/braking force distribution control unit is configured to set a target slip ratio of the front wheel and a target slip ratio of the rear wheel in the control of the output allocation ratio, and perform a control of an output shaft rotation speed of the front-wheel longitudinal force generator and an output shaft rotation speed of the rear-wheel longitudinal force generator and thereby cause the slip ratio of the front wheel to be actually outputted and the slip ratio of the rear wheel to be actually outputted to match the target slip ratio of the front wheel and the target slip ratio of the rear wheel, respectively.

3. The driving/braking force control apparatus according to claim 2, wherein the driving/braking force distribution control unit is configured to perform the control of the output allocation ratio and thereby cause a sum of the longitudinal force of the front wheel and the longitudinal force of the rear wheel to match a predetermined requested longitudinal force at least in a region up to a point where an absolute value of one of the longitudinal force of the front wheel and the longitudinal force of the rear wheel reaches zero.

4. The driving/braking force control apparatus according to claim 3, wherein the driving/braking force distribution control unit is configured to disable inversion of a sign of the longitudinal force of the front wheel or the longitudinal force of the rear wheel to be caused by a change in the output allocation ratio between the front-wheel longitudinal force generator and the rear-wheel longitudinal force generator.

5. The driving/braking force control apparatus according to claim 2, wherein the tire lateral force change rate output unit comprises a map in which the change rate of the tire lateral force of the front wheel to the slip ratio of the front wheel and the change rate of the tire lateral force of the rear wheel to the slip ratio of the rear wheel are read based on the turning state of the vehicle.

6. The driving/braking force control apparatus according to claim 1, wherein the driving/braking force distribution control unit is configured to perform the control of the output allocation ratio and thereby cause a sum of the longitudinal force of the front wheel and the longitudinal force of the rear wheel to match a predetermined requested longitudinal force at least in a region up to a point where an absolute value of one of the longitudinal force of the front wheel and the longitudinal force of the rear wheel reaches zero.

7. The driving/braking force control apparatus according to claim 6, wherein the driving/braking force distribution control unit is configured to disable inversion of a sign of the longitudinal force of the front wheel or the longitudinal force of the rear wheel to be caused by a change in the output allocation ratio between the front-wheel longitudinal force generator and the rear-wheel longitudinal force generator.

8. The driving/braking force control apparatus according to claim 1, wherein the tire lateral force change rate output unit comprises a map in which the change rate of the tire lateral force of the front wheel to the slip ratio of the front wheel and the change rate of the tire lateral force of the rear wheel to the slip ratio of the rear wheel are read based on the turning state of the vehicle.

9. A driving/braking force control apparatus comprising:
a front-wheel longitudinal force generator configured to generate a longitudinal force of a front wheel of a vehicle;

a rear-wheel longitudinal force generator configured to generate a longitudinal force of a rear wheel of the vehicle; and circuitry configured to
- output a tire slip angle of the front wheel and a tire slip angle of the rear wheel based on a turning state of the vehicle,
- output a tire lateral force of the front wheel and a tire lateral force of the rear wheel based on the turning state of the vehicle,
- output a slip ratio of the front wheel and a slip ratio of the rear wheel based on the tire slip angle of the front wheel, the tire slip angle of the rear wheel, the tire lateral force of the front wheel, and the tire lateral force of the rear wheel,
- output a change rate of the tire lateral force of the front wheel to the slip ratio of the front wheel and a change rate of the tire lateral force of the rear wheel to the slip ratio of the rear wheel,
- set a target value of an additional yaw moment to be applied to the vehicle, and
- perform a control of an output allocation ratio between the front-wheel longitudinal force generator and the rear-wheel longitudinal force generator based on the target value of the additional yaw moment, the change rate of the tire lateral force of the front wheel to the slip ratio of the front wheel, and the change rate of the tire lateral force of the rear wheel to the slip ratio of the rear wheel.

* * * * *